UNITED STATES PATENT OFFICE.

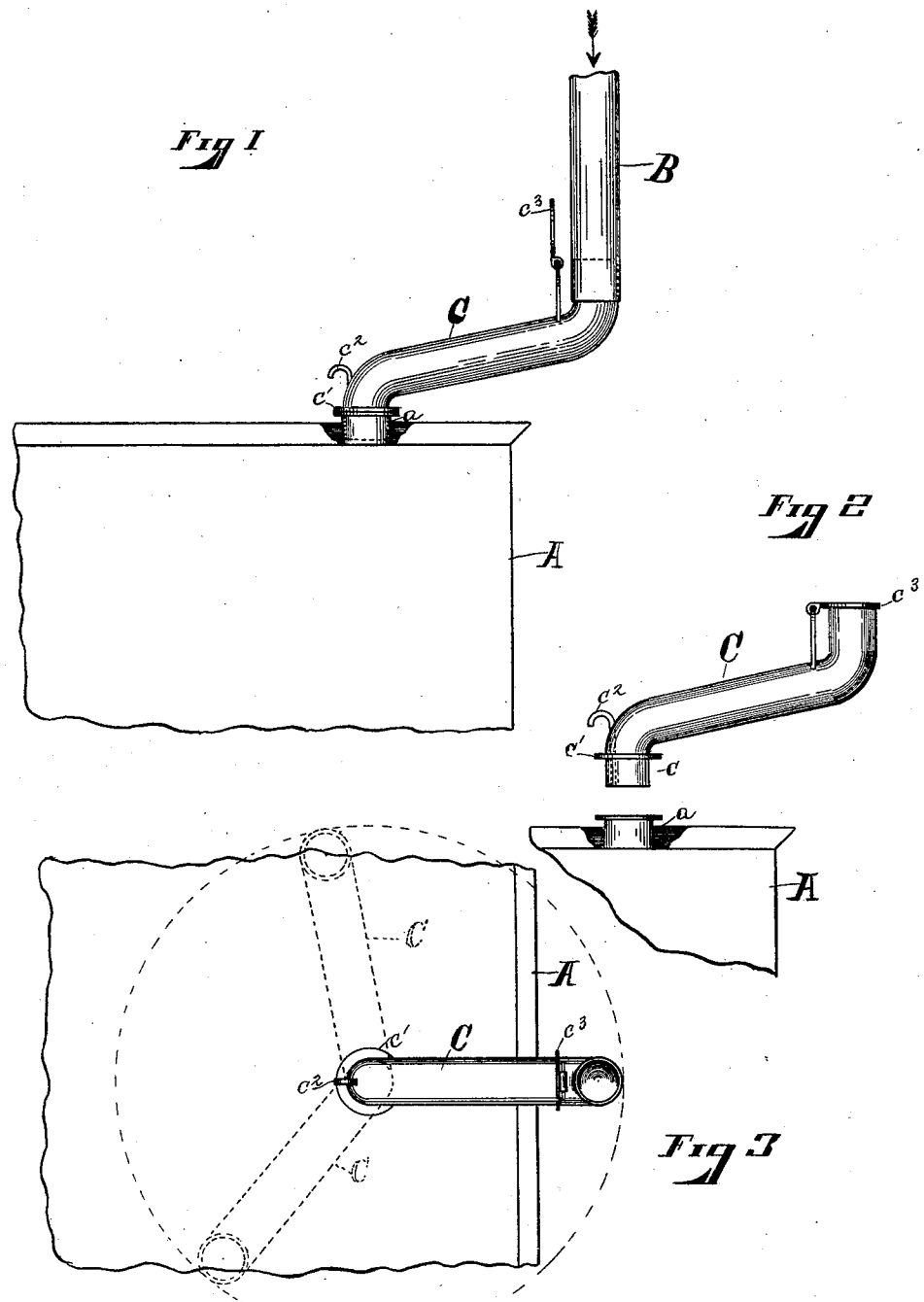

WILLIAM W. ROGERS AND FRANK W. ROBERTSON, OF COVINGTON, KENTUCKY.

SUPPLY-PIPE FOR LOCOMOTIVE-TANKS.

SPECIFICATION forming part of Letters Patent No. 633,277, dated September 19, 1899.

Application filed June 5, 1899. Serial No. 719,363. (No model.)

*To all whom it may concern:*

Be it known that we, WILLIAM W. ROGERS and FRANK W. ROBERTSON, citizens of the United States, and residents of Covington, in the county of Kenton and State of Kentucky, have invented certain new and useful Improvements in Supply-Pipes for Locomotive-Tanks, of which the following is a specification.

In getting a supply of water into the tanks of locomotive-engines from railroad-tanks and stand-pipes heretofore much loss of time as well as danger to passengers is occasioned by the shifting and jerking back and forth of the train in order to get the supply-opening of the locomotive or tender tank at a certain spot to register with the discharge-pipes of the railroad tanks or stand-pipes, commonly called "spotting the engine."

The object of our invention is to overcome the necessity of spotting the engine by enlarging the space within which the tender-tank may take on water. This object is attained by means of a pipe to be coupled to the supply-opening of the tender-tank, so that it may be rotated quickly to any point within its radius to meet the discharge-pipe of a railroad-tank.

Referring to the drawings, in which like parts are indicated by similar reference-letters wherever they occur throughout the various views, Figure 1 is a view in side elevation of my rotating pipe coupled to the supply-opening of a tender-tank and communicating with the discharge-pipe of a railroad-tank, the tender-tank being shown only in part and its side being broken away near the top to show the supply-opening. Fig. 2 is a similar view with the pipe in position to be inserted in the supply-opening, the upper end of the pipe being closed by its lid. Fig. 3 is a plan view of the pipe inserted in the supply-opening, as in Fig. 1, with the lid standing open preparatory to being connected to the discharge-pipe of the railroad-tank, the dotted lines showing the path of and positions that may be assumed by the pipe.

Referring to the parts, the tender-tank A, with its supply-opening $a$ and the flexible hose B, depending from the discharge-pipe of a stand-pipe or railroad-tank, are of ordinary construction and need not be specifically described.

The rotating pipe C is curved down at one end to form a vertical extension $c$, which is to slide snugly within the supply-opening $a$ of the tank. Around the upper end of this extension $c$ is a circular flange $c'$ to rest upon top of the opening $a$ to steady the extension within the opening when the pipe C is rotated therein. The other end of the pipe C is turned upward to connect with the flexible hose or sack B. The discharge-pipes of stand-pipes are themselves adapted to be swung in a circular path, so that in stopping the locomotive, should its supply-opening come within a distance of the discharge-pipe equal to the diameter of the path of pipe C, it may be made to register with the discharge-pipe by bringing both pipes to the point where their paths intersect without moving the engine.

In its lower end the pipe C has a tube $c^2$, which is to project into the tank A to allow the air which is displaced by the inflowing water to escape. At its upper end it has a hinged lid $c^3$ to close the end of the pipe C when it is not in use to prevent coal and other foreign matter from falling into the tank.

What we claim is—

1. In combination with a tender-tank a pipe coupled to the supply-opening thereof so as to be rotated to register with the discharge-pipes of railroad-tanks or stand-pipes, substantially as shown and described.

2. In combination with a tender-tank the pipe having one end curved down to form a vertical extension to enter the supply-opening of said tank and a flange around said extension to rest upon the edge of said opening so that the pipe may be rotated therein so that its opposite end will register with the discharge-pipes of stand-pipes and railroad-tanks, substantially as shown and described.

3. In combination with a tender-tank the pipe having one end curved down to enter the supply-opening of the tank so that the pipe may be rotated to have its opposite end register with the discharge-pipes of stand-pipes and railroad-tanks and the tube within said end that enters the opening for the escape of the air displaced by the inflowing water, substantially as shown and described.

4. In combination with a tender-tank the pipe the lower end thereof coupled to the supply-opening of the tank to be rotated so that its upper end registers with the discharge-pipes of stand-pipes and railroad-tanks, and the swinging lid for closing the upper end when not admitting water, substantially as shown and described.

5. As a new article of manufacture the pipe having the lower end bent down into a vertical extension to enter the supply-opening of a tender-tank, a flange around said extension to steady the pipe in its rotation in said opening, a tube in said end for the exit of air, the other end bent up to register with the discharge-pipes of stand-pipes and railroad-tanks by the rotation of the pipe, substantially as shown and described.

WM. W. ROGERS.
FRANK W. ROBERTSON.

Witnesses:
WALTER F. MURRAY,
EMMA LYFORD.